Figure 1:
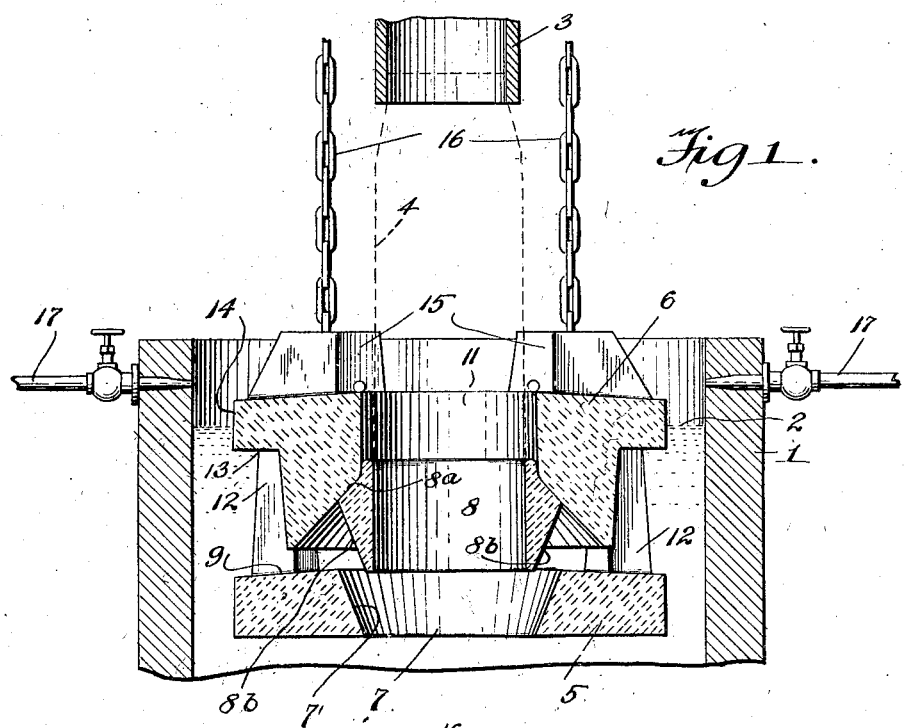

Oct. 16, 1923.                                                    1,471,002
A. PARYS
GLASS MACHINERY
Filed Feb. 25, 1921                        2 Sheets-Sheet 1

Inventor
Andy Parys.
By C. C. Shepherd
Attorney

Oct. 16, 1923.

A. PARYS 1,471,002

GLASS MACHINERY

Filed Feb. 25, 1921    2 Sheets-Sheet 2

Inventor

Andy Parys.

By C. C. Shepherd,

Attorney

Patented Oct. 16, 1923.

1,471,002

UNITED STATES PATENT OFFICE.

ANDY PARYS, OF MOUNT VERNON, OHIO.

GLASS MACHINERY.

Application filed February 25, 1921. Serial No. 447,793.

*To all whom it may concern:*

Be it known that ANDY PARYS, a citizen of the United States, residing at Mount Vernon, in the county of Knox and State of Ohio, has invented certain new and useful Improvements in Glass Machinery, of which the following is a specification.

This invention relates to improvements in glass working apparatus and has for its primary object the provision of apparatus whereby the successive dipping of a drawing or blowing tube into a body of molten glass may be expeditiously accomplished without diminution in the rapidity of operation of the apparatus for reasons and conditions heretofore present in apparatus of this character, involving the removal or skimming of congealed glass incrustation from around the walls of the openings of the members into which the tube is inserted when brought into engagement with the glass of a tank.

In the formation of glass rolls, used in the manufacture of ordinary window and similar glass, it is customary to employ in the upper part of the glass containers, a pair of separable ring members, formed of fire clay and commonly termed pot structures, the said members being formed to include axially situated aligning openings through which the end of a pipe or tube may be inserted and dipped into the glass contained within the tank, and whereby upon the subsequent elevation of the tube or pipe, the glass within the tank will be drawn upwardly in unison with the tube through the openings in the said members to produce the glass roll, which latter when drawn to suitable length is severed by the application of heat directed toward the base thereof and is thus severed from the glass within the tank. This process of roll manufacture is common, but is open to the objection that after the formation of each individual roll, it is necessary that the old glass, adhering to the sides of the member openings be removed in order that when the tube or pipe is subsequently dipped into the tank, its operation will not be retarded or in any way obstructed by the glass accumulation on the walls of the openings provided in the ring members. This operation of removing the hardened glass involves considerable time and necessarily slackens the operation of the apparatus and its consequent output until the scaling operation has been completed. It is, therefore, the object of the present invention to produce a pot structure whereby the surplus glass will be automatically removed from the dipping openings thereof, so that the apparatus may be operated substantially continuously without the delays that have hitherto been present in cleaning or removing the glass scale.

With these and other objects in view, as will appear as the description proceeds, the invention accordingly consists in the novel features of construction, combinations of elements and arrangements of parts, hereinafter to be fully described and pointed out in the appended claims.

Figure 2:
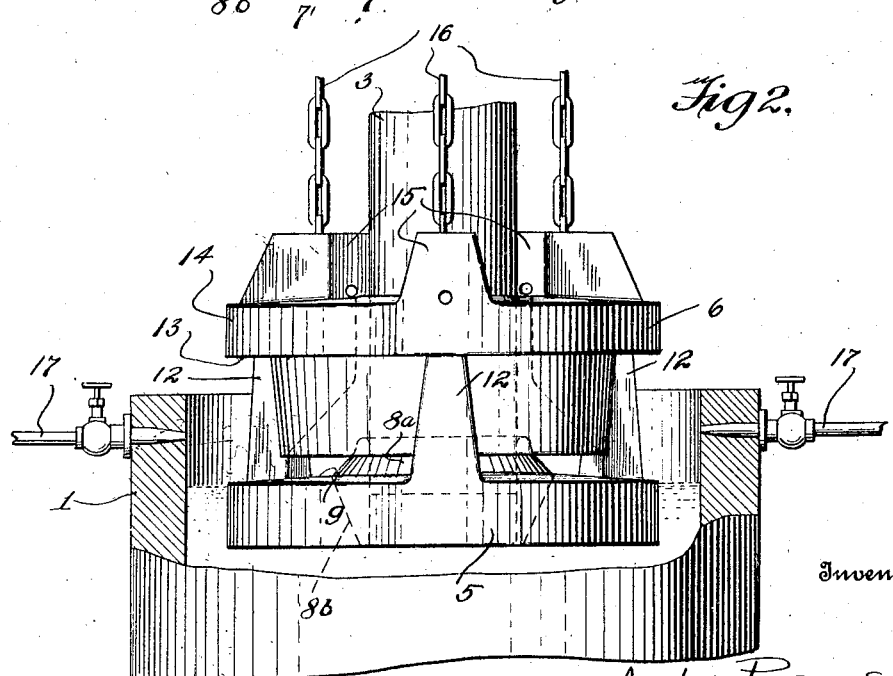
Figure 3:
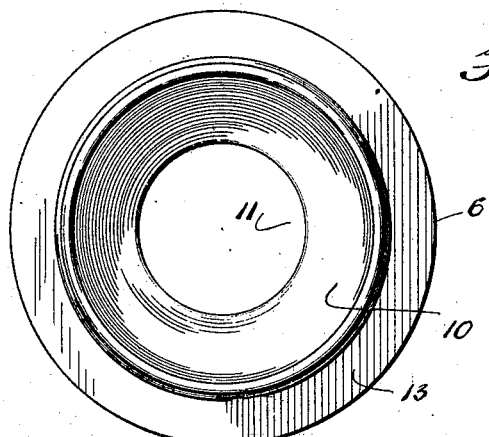
Figure 6:
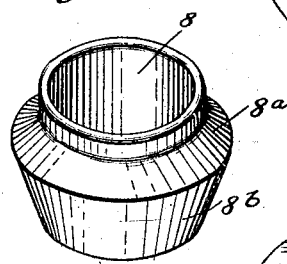
Figure 4:
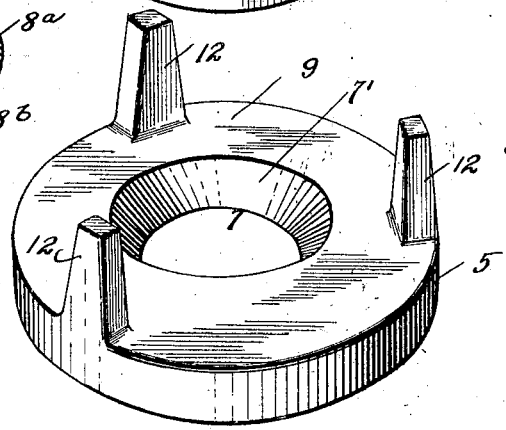
Figure 5:
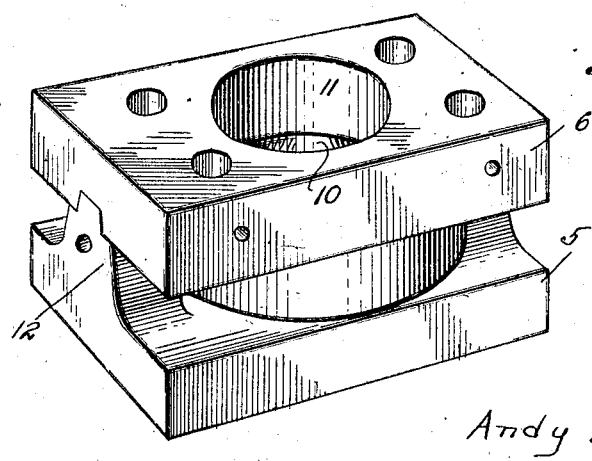

In the accompanying drawings, forming a part of this specification, and in which similar characters of reference denote like and corresponding parts throughout the several views thereof:

Figure 1 is a vertical longitudinal sectional view taken through the glass working apparatus comprising the present invention and disclosing the dipping rings in their submerged position, Figure 2 is a side elevation of the apparatus disclosing the rings in their elevated positions, Figure 3 is a bottom plan view of the upper ring, Figure 4 is a perspective view of the lower or base ring, Figure 5 is a perspective view disclosing a slightly modified form of the invention, and Figure 6 is a detail perspective view of the floating collar.

Referring more particularly to the details of the invention, the numeral 1 designates a tank or other container which is capable of receiving a suitable body of molten glass, the level of which being indicated by the numeral 2. Cooperative with the tank 1 is a drawing pipe 3, which is situated so as to be vertically movable with respect to the vertical axis of the tank 1, and the lower end of the pipe 3 is adapted, as usual, and by the agency of suitable mechanism, to be dipped into the tank 1 beneath the level 2 of the molten glass therein and whereby upon the provision of a partial vacuum within the pipe 3, or any other equivalent method, the subsequent raising of the pipe will result in lifting a portion of the glass 2 from the tank to produce a roll 4 thereof, the shape of the roll being designated by the dotted lines shown in Figure 1. In apparatus of this character it is customary to employ in connection with the upper part of the tank 1 a plurality of dipping members which are situated so as to float upon the level of the glass and are provided with axially situated openings through which the lower end of the pipe 3 is permitted to pass when being dipped into the body of the glass contained within the tank, the openings in the members serving to control and shape the body of the glass lifted from the tank by the subsequent elevation of the pipe. These dipping or shaping members are preferably formed from a suitable refractory material and the openings therein are so disposed as to engage the glass lifted by the drawing pipe. By so engaging the outer surfaces of the lifted glass, the openings in said members become coated with a part of the glass engaged thereby and consequently it is the common practice, after each operation, to remove this accumulated glass by scraping the same from the walls of the openings, in order that the accumulated glass may be removed so as not to interfere with the formation of subsequent rolls or with the dipping of the pipe 3. The process of removing the accumulated glass, which becomes hardened by cooling is a difficult, slow and tedious operation, and consequently the output of the apparatus is delayed until a thorough cleaning of the internal walls of the dipping members has been effected. Therefore, in view of the expense, delays and decreased output of the apparatus, the present invention comprehends the provision of a pair of dipping members which will be so formed as to automatically remove the surplus glass from the walls of the dipping openings thereof without involving in any way manual care or attention, the prime purpose in view being to enable the apparatus to be operated with full efficiency, with an entire absence of delay and expense heretofore necessary in cleaning or removing the surplus glass from the dipping members.

To this end, the present invention employs a pair of dipping members which include separable lower and upper sections 5 and 6 respectively, the latter in the preferred form of the invention are of annular exterior configuration, although this is mainly a matter of design and may of course be varied. The said sections are preferably formed from fire clay or some other equivalent or refractory material, so as to be capable of successfully withstanding the relatively high temperatures incident to the maintenance of molten glass within the tank 1. In this instance the sections are deposited within the upper part of the tank so as to be buoyantly supported upon the body of the glass 2 within the tank. The lower section 5 is provided with a centrally disposed, vertically extending axial opening 7, which includes a downwardly beveled wall designated by the numeral 7′. Arranged to be normally seated within the conical opening 7 is a floating collar 8, which has its outer surface formed to include reversely beveled annular surfaces $8^a$ and $8^b$, the latter surface being so disposed as to seat upon the walls of the opening 7, substantially after the manner indicated in Figure 2, while the wall $8^a$ is adapted to be received within the lower, flaring frusto-conical mouth 10 of a vertically disposed opening 11 provided in the upper section, and situated substantially in axial alignment with the dipping opening of the lower section, the formation of the mouth 10 and the presence of the floating collar 8 constituting the gist of the present invention.

The sections 5 and 6 are relatively separable, and in this instance are maintained in registration by providing the beveled surface 9 of the lower section with integral upstanding lugs or guides 12, which are so disposed as to engage the outer annular surface 13 of the upper section 6, the said guides serving to insure axial registration between the openings 7 and 11 by preventing undue lateral movement between the sections. The upper part of the section 6 is provided with an outstanding, annular flange 14, which is so disposed that the lower surface thereof will rest upon the upper ends of the lugs or guides 12, and in this manner to enable the upper section to be supported by the lower section in proper relative registration. The upper surface of the section 6 is slightly beveled, as shown, and is provided with spaced integral upstanding lugs 15, preferably three in number, to which are secured in any suitable manner the lower ends of upwardly extending vertically situated chains 16, the upper ends of said chains being connected, in any suitable manner, with a suitable winding mechanism, not shown, by means of which the upper section may be raised or lowered into and out of the tank, in order that the sections may assume the different operating positions disclosed in Figures 1 and 2.

In operation, the dipping members are suitably positioned within the tank 1 as shown particularly in Figure 2, in which it will be observed that the lower section will be situated so as to float upon the surface of the glass 2, the chain 16 being elevated, so as to lift the upper section and to remove the weight of the latter from the lower section. This permits the floating collar 8 to seat within the openings 7 and to be thus in position for dipping operation. When the sections are so positioned, the drawing pipe 3 is lowered so as to pass through the registering openings 7 and 11 and through the bore of the collar 8 so that the lower end of the pipe may be positioned within the glass which will arise through the bore of the collar 8. The pipe 3 is then elevated by mechanism common to apparatus of this character, thus drawing a portion of the glass within the tank upwardly and outwardly through the openings provided in the sections 5 and 6, the shape of the glass so elevated being regulated and defined by the shape of the aforesaid openings, so that a roll will be produced of uniform and proper contour. After the pipe 3 has been elevated to the desired extent so that the roll 4 will be of proper length, the lower end of the roll is separated from the glass within the tank by lowering the chains 16, which allows the weight of the upper section to be deposited upon the lower section, and by reason of the collective weight of the sections, the latter will be partly submerged in the glass 2 to assume substantially the positions disclosed in Figure 1. This results in aligning the upper surface of the section 6 with the tips of a plurality of burners 17, situated circumferentially of the tank 1. These burners then operate to project a flame across the upper surface of the sections 6 between and around the lugs 15 thereof, in order that the base of the roll 4 will be severed by the heat of the flames produced from the burners 17, thus enabling the finished roll to be readily removed from the apparatus. After the roll has been thus severed the chains 16 are then elevated to permit of the subsequent elevation of the dipping sections 5 and 6 until the position disclosed in Figure 2 is again assumed. It will be observed that when the sections 5 and 6 are substantially submerged, the collar 8 will leave its seat 7' and will float upwardly so as to seat against the beveled walls of the opening 10, in order to substantially close the gap existing between the sections and to provide an uninterrupted bore from which the glass may be extracted.

When the sections are in the elevated positions, the glass remaining within the several openings thereof is subjected to the heat of the flames emitted by the burners 17, which acts upon the outer surface, particularly, of the sections 6 and cause the walls of the openings 10 and 11 to become heated, with the result that the glass, which may be retained within said openings, will be caused to flow automatically downward by gravity, and by reason of the flared mouth 10 the said glass will be deposited upon the inclined upper surface 9 of the lower section 5, and thence may be permitted to gravitate downwardly into the tank proper. By this construction it will be manifest that the apparatus may be used continuously so as to derive the full efficiency thereof and without resorting to the expediency heretofore employed of scraping the section openings manually to remove surplus or congealed and accumulated glass deposit from the walls thereof. By the elimination of this process the output of the apparatus is materially increased, as will be clearly understood by those versed in the art, and furthermore, the losses which have heretofore resulted from the breaking or cracking of the dipping sections, caused by the scraping operation and the variance in temperatures, will be largely precluded. It will be understood that it is not necessary to connect the sections 5 and 6 together mechanically, since the lower section, by reason of its buoyancy within the glass, will follow the movements of the upper section. In the modification shown in Figure 5, the principles of construction set forth heretofore obtain in precisely the same manner. In the modification shown in Figure 5, the principles of construction set forth heretofore obtain, the only difference between the preferred form of the invention and the modified form resides in the exterior configuration of the sections, the former being of annular configuration while the latter is substantially rectangular, in order that the same may conform with tanks of that particular design.

What is claimed is:

1. In glass working apparatus of the character described, a pair of dipping and shaping sections having registering vertically disposed openings formed therein, the opening in the upper of said sections terminating in an outwardly and downwardly flared mouth, lugs carried by the lower section for engagement with the upper section to hold the rims of the openings of the respective sections in spaced relation and maintaining said openings of said sections in relative registration.

2. In glass working apparatus of the character described, a pair of separable dipping and shaping sections formed from a refractory material and capable of floating upon a body of molten glass positioned within a tank, said sections being provided with vertically disposed dipping openings, situated in alignment and capable of receiving a roll drawing pipe, the lower end of the opening provided in the upper section being outwardly and downwardly flared to produce a relatively enlarged mouth, lugs disposed between the sections to hold the lower edge of the mouth spaced from the upper edge of the opening provided in the lower section, and for maintaining said sections in positions of relative registration.

3. In glass working apparatus of the character described, a pair of roll forming sections capable of being positioned within a tank containing a body of molten glass, the lower of said sections being capable of floating upon the upper surface of said glass, said sections being provided with registering dipping openings capable of receiving the drawing pipe and to govern the withdrawal of the glass by said pipe from the tank, the lower end of the opening provided in the upper of said sections being enlarged so that the lower edge thereof will overlapped the upper end of the opening provided in the lower of the sections, and guides arising from one of said sections and cooperative with the other of said sections for maintaining said openings in registration, and to maintain the lower portion of the upper section in spaced relation from the upper portion of the lower section.

4. In glass working apparatus of the character described, a pair of separable roll forming sections capable of being received within a glass container and tube deposited upon the surface of the glass provided in said container, said sections being provided with vertically disposed registration openings capable of permitting of the withdrawal of glass from said container, the lower end of the opening provided in the upper section being conically flared in a downward and outward direction, so that the lower edge of said opening will overlapped the upper edge of the opening provided in said lower section, and integral lugs arising from said lower section and cooperative with the sides of the upper section for maintaining said sections in positions of relative registration.

5. In glass working apparatus of the character described, lower and upper roll forming sections capable of being positioned in cooperation with a glass container for governing the withdrawal of glass from the container, said sections being provided with vertically aligned axially disposed openings, the opening in the upper of said sections having its lower end enlarged so as to be of greater diameter than the diameter of the upper end of the opening provided in the lower section, and guiding means cooperative with said sections for maintaining said openings in registration and to space the lower end of the upper section from the upper surface of the lower section.

6. In glass working apparatus of the character described, upper and lower roll forming sections arranged to be mounted within a glass container for governing the withdrawal of glass from said container, said sections being provided with registering draw openings, the lower end of the opening provided in the upper section being relatively enlarged with respect to the upper end of the opening provided in the lower section, whereby the walls of said openings will be laterally spaced, lugs arising from the lower section and cooperative with said upper section to maintain said sections in operative registration and to space the adjoining ends thereof, and means formed with the upper section for permitting of the mechanical raising and lowering thereof.

7. In glass working apparatus, in combination, a glass container, burners positioned above the level of the glass within said container, a pair of separable roll forming sections arranged to be positioned within said container, said sections being provided with registering openings, the opening in the upper section having its lower end relatively enlarged with respect to the upper end of the opening provided in the lower section, means for maintaining said sections in positions of relative registration, and means cooperative with the upper of said sections for raising the latter to a position permitting the sides thereof to be subjected to the heat of said burners when said sections assume an elevated position, said burners being further positioned to register with the upper surface of said upper section when the latter is in its lowered position.

8. In glass working apparatus of the character described, a pair of dipping and shaping sections having registering vertically disposed openings formed therein, the opening of the upper section terminating in an outwardly and downwardly flared mouth of greater diameter than the opening in the lower section, and a floating collar movable into and out of the openings of the respective sections and cooperative with the walls of the openings in both of said sections.

9. In glass working apparatus of the character described, a pair of dipping and shaping sections having registering vertically disposed openings formed therein, said openings having reversely inclined walls, and a floating collar movable into and out of the openings of the respective sections and having reversely inclined outer surfaces designed for cooperation with the walls of said openings, the positions of said collar being governed by the rise and fall of said sections in a body of glass.

In testimony whereof I affix my signature.

ANDY PARYS.